3,458,597
PROCESS FOR PREPARATION OF POLYMER
HYDROPEROXIDES
Harold Jabloner, Wilmington, Del., assignor to
Hercules Incorporated, Wilmington, Del., a
corporation of Delaware
No Drawing. Filed Sept. 3, 1965, Ser. No. 485,093
Int. Cl. C08f *15/46, 27/22*
U.S. Cl. 260—877                                        10 Claims

ABSTRACT OF THE DISCLOSURE

Graft copolymers are prepared by hydroperoxidizing a polymer, such as polypropylene, with oxygen in aqueous suspension in the presence of a cationic surface-active agent and a water-soluble persulfate and then contacting the hydroperoxidized polymer with a vinylidene monomer in the presence of a redox reducing agent.

This invention relates to an improved process for the preparation of modified polymers. More particularly, it relates to an improved process for the hydroperoxidation of polymers, and to the use of the hydroperoxidized polymer products in the preparation of graft copolymers.

It is well known in the prior art that graft copolymers are prepared by creating active sites on the main polymer chain or backbone, and initiating graft polymerization of a polymerizable monomer at these sites. While such active sites have been introduced into the polymer chain by various procedures, including heat, catalysis, or irradiation, the preferred method comprises the oxidation of hydrogen atoms on the polymer backbone by the use of an oxygen containing gas such as air, to cause the formation of hydroperoxide groups on the polymer chain. The basic patent relating to such hydroperoxide formation is U.S. 2,911,398 to Vandenberg. The Vandenberg process comprises contacting a polymer of a monoethylenically unsaturated monomer having hydrogen attached to tertiary carbon atoms in the polymer chain, or other oxidizable carbon atoms, with an oxygen containing gas, at a temperature between about 20° C. and about 200° C., preferably between about 60° C. and about 140° C. A free radical initiator and a base stabilizer are preferably added to the reaction mixture. The hydroperoxidation is generally carried out, according to the Vandenberg process, with the polymer in the form of a solution, suspension, dispersion, or emulsion, but may be effected in the absence of a diluent or solvent when the polymer is liquid at the oxidation temperature.

Now, in accordance with this invention, it has been unexpectedly found that both the hydroperoxidation of the polymer and the subsequent graft copolymerization of vinylidene monomers at the hydroperoxy sites can be effected much more rapidly, and hence in very short and economical times, in an aqueous polymer suspension which contains both a free radical initiator and a cationic soap. This process also gives much higher yields of hydroperoxide with less degradation of the polymer backbone and lower initiator levels are required.

Thus, briefly, the process of this invention comprises contacting an aqueous suspension of a polymer, such as for example, polypropylene, with a gas-containing free oxygen at a temperature of from about 20° C. to about 200° C. in the presence of a free radical initiator and a cationic soap, for a period of time sufficient to allow the formation of hydroperoxide groups on the polymer chain. If subsequent preparation of graft polymers from the resulting polymer hydroperoxides is desired, one or more vinylidene monomers can be graft polymerized at the hydroperoxy sites on the polymer chain by contacting the monomer and the hydroperoxidized polymer in the presence of a reducing agent.

Any polymer which contains hydrogen attached to a tertiary carbon atom of the polymer chain can be hydroperoxidized by the process of this invention. Exemplary of such polymers are homopolymers and copolymers of vinylidene and vinylene monomers, such as ethylene, propylene, butylene, styrene, ortho-, meta- and para-methyl-, -ethyl- and -isopropyl-styrenes, p-cyclohexylstyrene, p-chlorostyrene, p-nitrostyrene, 3-cyano-5-isopropyl-$\alpha$-methylstyrene, p-acetylstyrene, vinyl pyridine, vinyl naphthalene, vinyl ethers of methanol, ethanol, butanol, p-isopropylbenzyl alcohol, etc., vinyl esters such as vinyl acetate, vinyl propionate, vinyl isopropylbenzoate, etc., allyl acetate, methyl vinyl ketone, methyl acrylate, acrylonitrile, acrylamide, vinyl chloride, etc. Monomers which do not readily yield a polymer containing a tertiary hydrogen, or which yield a less readily oxidized hydrogen, such as methyl methacrylate, methacrylamide, methacrylonitrile; vinylidene chloride, isobutylene, methacrylic acid, methyl isopropenyl ketone, maleic anhydride, ethyl fumarate and the like can be copolymerized with one of the above monomers which yields readily oxidizable polymers, to produce a copolymer which can be hydroperoxidized by the instant process. Hydroperoxidized polypropylene prepared by the process of this invention is of particular interest, and hence polypropylene is the preferred starting polymer for the instant process.

The hydroperoxidation process of this invention is preferably carried out by suspending the polymer, such as polypropylene, in flake, granular or very finely divided form, or in the form of fiber, fabric, or film, in an aqueous solution of a cationic soap, heating the mixture to the desired temperature, contacting the polymer suspension with an oxygen-containing gas, and adding thereto a free radical initiator to initiate the formation of the hydroperoxide groups on the polymer chain. The presence of both the cationic soap and the free radical initiating compound during the hydroperoxidation reaction is the critical feature of this invention. Where both of these compounds are present during polymer-oxygen contacting, hydroperoxidation can be accomplished in a very short time, on the order of 5 to 30 minutes or less. Moreover, the hydroperoxides prepared by the instant process can be grafted with a typical polymerizable vinylidene or vinylene monomer in less than one hour, and generally in times as short as about 15 minutes. As will be readily appreciated, this saving in time allows increased production, and economical utilization of equipment and manpower, which cannot be achieved using the prior art processes, and at the same time this process gives rapid oxidation without degradation of the polymer or formation of substantial amounts of color bodies, carbonyl or ketonic groups, or other function impurities.

The process of this invention can be carried out using any cationic surface-active agent. Generally these surfactants are either surface-active quaternary ammonium salts or salts of higher alkylamines. They are characterized by having a long chain hydrophobic quaternary ammonium or alkyl amine cationic group and a hydrophilic anionic group, such as a chloride, bromide, sulfate, acetate, sulfonate or trifluoroacetate ion. The quaternary ammonium halides are the preferred cationic surfactants. Exemplary of these preferred cationic surfactants are alkyl trimethyl ammonium halides, dialkyl dimethyl ammonium halides, alkyl dimethyl ethyl ammonium halides, alkyltriethyl ammonium halides and alkyl benzyl dimethyl ammonium halides wherein the alkyl groups generally contain 8 to 24 carbon atoms. The commercial cationic surface-active agents are generally mixtures of the various alkyl trimethyl (or dimethyl ethyl, triethyl or benzyl dimethyl) or dialkyl dimethyl ammonium chlorides or bromides, including octyl-, decyl-, dodecyl-, tetradecyl-, hexadecyl- or octadecyl-trimethyl ammonium chloride, octyl-, decyl-, dodecyl-, tetradecyl-, hexadecyl- or octadecyl-dimethyl ethyl ammonium chloride, octyl-, decyl-, dodecyl- tetradecyl-, hexadecyl- or octadecyl-benzyl dimethyl ammonium chloride, or didodecyl-, ditetradecyl-, dihexadecyl-, or dioctadecyl- dimethyl ammonium chloride, or the corresponding ammonium bromides.

Other cationic surfactants which can be used in the process of this invention include the methoxysulfonate of oleoyldiethylmethylene diamine, the methoxyacetate of oleoyldiethylmethylenediamine, the acetate of dehydroabietylamine, the acetate of disproportionated rosin amine, etc.

Free radical generating agents that can be used as initiators for the oxidation are the water-soluble persulfates, i.e., the Group I-A metal persulfates such as sodium persulfate, potassium persulfate, lithium persulfate, rubidium persulfate, and cesium persulfate; and ammonium persulfate.

Although applicant does not wish to be bound to any specific theory of this invention, it appears that the cationic soap and the free radical initiator react to form a water-insoluble organoammonium per- compound such as a persulfate, which adsorbs on the polymer surface, and subsequently decomposes thereon, initiating polymer peroxide formation. This mechanism is believed to facilitate a rapid conversion of the polymer to hydroperoxide with little polymer degradation.

The oxygen-containing gas used in the process of this invention is preferably air, due to its ready availability. However, other gaseous compositions containing molecular oxygen may also be used. Thus, pure oxygen, or a mixture of oxygen and some inert gas or gases, such as nitrogen, helium, etc., can also be used.

The aqueous solution of the polymer can be contacted with the oxygen-containing gas either at room temperature or at elevated temperatures. Thus, the hydroperoxidation process of this invention can be carried out at temperatures of from about 20° C. to about 200° C. Reaction temperatures of between about 60° C. and about 140° C. are preferred, with a temperature of about 100° C. being optimum. The process can be operated either at atmospheric or superatmospheric pressures, and either as a batch or continuous process. The reaction time necessary for completion of the invention, as pointed out above, is very short, generally on the order of about one-half hour or less.

Thus, by the instant process, in very short periods of time any desired amount of hydroperoxide groups can be introduced into the polymer chains. The hydroperoxy groups added to the polymer chains will generally range from about 0.004% to about 5% or higher by weight of the polymer.

The polymers which are hydroperoxidized by the process of this invention can be of any molecular weight. Generally the polymers will contain more than about 20 monomer units, and they can contain up to many thousands of monomer units.

The polymer hydroperoxides produced by this process can be isolated, or, if desired, vinylidene monomers can be directly grafted onto the polymer hydroperoxides, without isolating the latter. It is preferable to remove the water from the aqueous polymer suspension prior to the grafting step, because of the presence of low molecular weight, water-soluble by-products which may be present in the suspension, resulting from small amounts of chain cleavage which may occur during the hydroperoxidation process. These by-products contain hydroperoxide groups and, therefore, can cause the formation of polymers resembling homopolymers during the grafting step unless they are removed. The water can be removed from the polymer suspension by any suitable means, such as for example, by centrifugation, filtration, etc. Alternatively, the low molecular weight hydroperoxide containing by-products can be reduced prior to the grafting step, by treatment with chemical reducing compounds.

Graft copolymers are prepared from the polymer hydroperoxides by contacting the hydroperoxidized polymer and a polymerizable vinylidene monomer under such conditions that the hydroperoxide groups on the polymer are decomposed to provide a free radical source for the initiation of graft polymerization of the monomer at the site of the hydroperoxy group on the polymer chain. Such conditions can be provided by contacting the monomer and the polymer hydroperoxide in the presence of a reducing agent at a temperature between about −50° C. and about 140° C., preferably between about −20° C. and about 100° C. Thus, the graft polymerization is carried out in a redox system, i.e., in the presence of a redox reducing agent. The graft polymerization may be carried out by bulk, solution, suspension, or emulsion polymerization techniques, and the particular reducing agent used will depend upon the polymerization technique which is selected. The preferred redox reducing agents are salts or complexes of metals capable of existing in more than one valence state, and which are preferably in a reduced oxidation state. Particularly preferred redox reducing agents include vanadyl sulfate and ferrous sulfate. Other redox reducing agents which can be used are ferrous pyrophosphate, ferrous sulfide, the ferrous complex of ethylenedinitrilotetraacetic acid, ferrous o-phenanthroline, ferrous or ferric acetylacetone, ferrocyanide and the corresponding cobalt, nickel, copper, mercury, chromium, manganese, vanadyl and the like compounds. Other reducing agents which can be used include sodium formaldehyde sulfoxylate, polyamines such as diethylenetriamine, triethylenetetraamine, tetraethylenepentamine, monoamines, sodium hyposulfite, and the like.

The graft polymerization of the vinylidene monomer and the hydroperoxidized polymer preferably is carried out in an inert atmosphere, such as under nitrogen. Thus, the oxygen atmosphere used in the hydroperoxidation step should be removed and replaced with an inert atmosphere or the hydroperoxidized polymer removed from the oxygen atmosphere and inserted into an inert atmosphere prior to addition of the monomer.

The reducing agent is preferably added to the polymer suspension after the monomer is brought into contact with the hydroperoxidized polymer, depending on the particular reducing agent used. A simple way of carrying out the process is to pick up the cake of hydroperoxidized polymer from the centrifuge or filter, etc., in a second aqueous stream which contains the monomers to be grafted on the polymer backbone. The reducing agent is then added to the new aqueous suspension of the hydroperoxidized polymer and the monomer or monomers.

Any monomer which can be polymerized by a free radical mechanism can be drafted onto the hydroperoxidized polymer chain. Exemplary of monomers which can be so grated are ethyleneically unsaturated monomers, for example, styrene, alkyl-substituted styrenes, such as α-methylstyrene, etc., olefins and diolefins such as ethylene, propylene, butene-1, and butadiene, esters of unsaturated acids, such as methyl, ethyl, butyl, etc., esters of acrylic, methacrylic and α-chloroacrylic acids, and the like, unsaturated acids, such as acrylic or methacrylic acid, unsaturated nitriles such as acrylonitrile, methacrylonitrile, etc., unsaturated halides such as vinyl chloride, vinylidene chloride, etc., vinyl esters such as vinyl acetate, vinyl propionate, and the like, vinyl ethers, vinyl pyridine, and other vinyl compounds, allyl compounds such as allyl acetate, allyl alcohol, allyl chloride, methallylacetate, allyl amine, etc., ethylene maleate, maleic anhydride, acrylamide, methacrylamide, diethylaminoacrylamide, diethylaminoethyl acrylate, vinyl pyrrolidone, 2- and 4-vinyl pyridines, and the like, or mixtures of two or more of these monomers. The amount of monomer which is reacted with the polymer hydroperoxide can be varied over a wide range, but in general is from about 5 to about 100,000 parts of monomer per 100 parts of polymer hydroperoxide, and preferably from about 20 to about 10,000 parts of monomer per 100 parts of polymer hydroperoxide. Particularly useful products are prepared when from about 50 to about 500 parts of monomer per 100 parts of polymer hydroperoxide are used.

As pointed out above, the graft polymerization according to the instant process occurs very rapidly, with less than one hour, and generally only about 15 minutes or less, being required to complete the desired grafting.

The graft copolymers prepared by the process of this invention may be polar, nonpolar, or may contain both polar and nonpolar units. The graft copolymers which are polar in character are useful as protective colloids, paper-coating agents, paper wet and dry strength agents, and oil well drilling muds. The nonpolar graft copolymers can be used as plasticizers, film formers, fibers and elastomers. The graft copolymers which contain both polar and nonpolar units are useful as emulsifiers, protective colloids, surface-active agents, detergents, wetting agents, paper sizes, textile sizes, anti-static agents, foaming agents, oil additives, dyeing aids, and the like.

The polymer hydroperoxides produced by this process can, of course, be used to prepare the above described graft copolymers. They can also be used as initiators for polymerizations catalyzed by free radicals, such as for example, styrene, methylmethacrylate, butadiene-styrene, and the like.

The following examples illustrate the process of preparing polymer hydroperoxides in accordance with this invention and the use of the products so obtained in the preparation of graft copolymers. All parts and percentages are by weight unless otherwise indicated. By the term "reduced specific viscosity" (RSV) is meant the $\eta_{sp}/c$ determined on a solution of the polymer in a given diluent.

Examples 1 and 2

These examples demonstrate the criticality in using a cationic surfactant in the hydroperoxidation reaction.

Five parts of crystalline polypropylene flake and 50 parts of water were charged to each of four reaactors. Then, the amounts of the surfactants indicated in the following table were added to the reactor. In the controls, a well known anionic surfactant (sodium lauryl sulfate) was used, while in Examples 1 and 2, a cationic surfactant (a mixture containing 90% hexadecyltrimethyl ammonium chloride and a small amount of octadecyl trimethyl ammonium chloride) was used. After addition of the surfactant, the polymer slurries were sparged with oxygen for 5 minutes, and the reactors were pressurized to 5 p.s.i.g. with oxygen and were heated to 100° C. A water solution of potassium persulfate was then added to each reactor in the amounts indicated in the table, and the reaction mixture was maintained at 100° C. for an additional five minutes. The reactors were then cooled and vented, and the polymer from each reactor was filtered, washed with water and dried. The polymers were analyzed for oxygen content, and the results are set forth below.

a cationic surface-active agent, in the form of a 75% solution in isopropanol-water of a 25:75 mixture of dihexadecyl dimethyl ammonium chloride and dioctadecyl dimethyl ammonium chloride. The resulting slurry was stirred and sparged with oxygen for thirty minutes, after which the reactor was pressurized to 5 p.s.i.g. with oxygen and heated to 100° C. A solution of four parts of potassium persulfate in 100 parts of water was added to the reaction mixture over a period of about ten minutes, and the resulting reaction mixture was maintained at 100° C. for an additional ten minutes and then cooled rapidly. The polymer was separated by filtration and washed with water. On analysis, the resulting polymer product was found to have an active oxygen content of 0.053 milliequivalent per gram of dried polymer (0.0424% active oxygen).

The hydroperoxidized polymer was mixed with 1000 parts of water and 400 parts of dimethylaminoethyl methacrylate were added. Thes uspension was sparged with nitrogen for one hour after which it was pressurized to 5 p.s.i.g. with nitrogen and heated to 90° C. A solution of 0.8 part of vanadyl sulfate dihydrate and 2.72 parts of disodium ethylenediamine tetraacetic acid in 100 parts of water was added over a 15-minute period. After the addition was complete, 0.4 part of 2,6-di-tert-butylcresol in 4 parts of acetone was added. The suspension was cooled, diluted with three volumes of water and filtered. The dried polymer containe 0.4% nitrogen, which corresponds to 4.5% dimethylaminoethyl methacrylate.

Example 4

A reactor was charged with 200 parts of crystalline polypropylene flake, 1000 parts of water and 0.23 parts of a cationic surface-active agent, which was a 50% solution in isopropanol-water of about 90% hexadecyl trimethyl ammonium chloride and a small amount of octadecyl trimethyl ammonium chloride. The slurry of these materials was stirred, sparged with oxygen for thirty minutes and the reactor was then pressurized to 5 p.s.i.g. with oxygen and heated to 100° C. Four parts of potassium per sulfate in 100 parts of water were added to the reaction mixture over a period of ten minutes and the reaction mixture was then maintained at 100° C. for an additional ten minutes. The reactor was cooled, vented, and the polymer was separated by filtration and washed wtih water. Analysis showed the polymer product to contain 0.033 milliequivalent of active oxygen per gram of dried polymed. (This is 0.0264% active oxygen.)

The hydroperoxidized polypropylene was suspended in 1000 parts of water and 250 parts of freshly distilled methyl methacrylate were added. The mixture was sparged with nitrogen for one hour, after which the reactor was pressurized to 5 p.s.i.g. with nitrogen and heated to 90° C. A solution of 0.1 part of vanadyl sulfate in 100 parts of water was added during 15 minutes, after which 0.5 part of sodium diethyldithiocarbamate in 50 parts of water was added. The reaction mixture was heated to 100° C. and held at that temperature for 10 minutes. It was then cooled, the suspension was diluted with an equal volume of water and the polymer was separated by filtration, washed and dried. Infrared analysis showed it to contain 10.5% methyl methacrylate.

TABLE

| Ex. No. | Type surfactant | Amount of active surfactant (part) | Amount of $K_2S_2O_8$ (part) | Addition time of $K_2S_2O_8$ (min.) | Oxygen content of polymer product, percent |
| --- | --- | --- | --- | --- | --- |
| Control | Anionic | 0.05 | 0.0084 | 5 | 0.04 |
| 1 | Cationic | 0.035 | 0.0084 | 5 | 0.00 |
| Control | Anionic | 0.05 | 0.05 | 10 | <0.02 |
| 2 | Cationic | 0.035 | 0.05 | 10 | 0.01 |

Example 3

A reactor was charged with 200 parts of crystalline polypropylene flake, 100 parts of water and one part of

Example 5

A reactor was charged with 100 parts of amorphous, predominately syndiotactic polypropylene (having an RSV of 2.1 as measured on a 0.1% solution in decahydronaphthalene at 135° C.), which had been cut into pieces less than about ½ inch square, 1000 parts of water and 0.48 part of a cationic surfactant added as a soft paste containing 75% of a 25:75 mixture of dihexadecyl dimethyl ammonium chloride and dioctadecyl dimethyl ammonium chloride. The reaction mixture was sparged with oxygen for 30 minutes and the reactor was then pressurized to 5 p.s.i.g. with oxygen. The reaction mixture was heated to 100° C. and a solution of 2 parts of potassium persulfate in 100 parts of water was pumped into the reactor over a period of ten minutes. The reaction mixture was held at 100° C. for an additional ten minutes and then was cooled rapidly. The reaction product was filtered, washed with water and dried at room temperature under one mm. of mercury pressure. The hydroperoxidized polymer, on analysis, was found to contain 0.012 milliequivalent of active oxygen per gram (0.0096% active oxygen).

Example 6

A sample of a commercial ethylene-propylene copolymer rubber containing 50 mole percent of ethylene and having an RSV of 3, as measured on a 0.1% solution in decahydronaphthalene at 135° C., was mixed with benzene to form a thick, lumpy solution, and then was precipitated into methanol. This rubber, after drying, was cut into small pieces. The oxidation procedure of Example 5 was then repeated exactly, except that the above described ethylene-propylene copolymer rubber was substituted for the amorphous polypropylene treated in Example 5. The resulting oxidized copolymer contained 0.012 milliequivalent of active oxygen per gram of polymer (0.096% active oxygen).

Example 7

A reactor was charged with 5 parts of crystalline polypropylene flake, 50 parts of water, and 0.05 part of a cationic surfactant (the acetate of disproportionated rosin amine). The reactor was flushed with oxygen for ten minutes, pressurized to 5 p.s.i.g. with oxygen, and the reaction mixture was heated at 100° C. with stirring for ten minutes. Then a solution of 0.05 part of potassium persulfate in one part of water was added during a period of ten minutes, after which the reactor was cooled rapidly. The resulting polymer product was separated by filtration, washed with water and dried. The dried polymer product contained 0.006 milliequivalent of active oxygen per gram of polymer (0.0048% active oxygen).

Example 8

The procedure of Example 7 was duplicated except that the cationic surface-active agent used here was 0.025 part of a mixture of 8% dioctyl dimethyl ammonium chloride, 9% didecyl dimethyl ammonium chloride, 47% didodecyl dimethyl ammonium chloride, 18% ditetradecyl dimethyl ammonium chloride, 8% dihexadecyl dimethyl ammonium, and 10% dioctadecyl dimethyl ammonium chloride. The dried polymer product of this example contained 0.008 milliequivalent of active oxygen per gram of polymer (0.0064% active oxygen).

Example 9

A strip of plain weave fabric, woven from 100% polypropylene fiber, was scoured in an alkaline bath and then was extracted with chloroform for 24 hours and dried. A piece of this cloth, 1.742 parts, was placed in a reactor with 100 parts of water and 1 part of a 50% solution of a cationic surfactant containing 90% hexadecyl trimethyl ammonium chloride and 6% octadecyl trimethyl ammonium chloride. The reactor was sparged with oxygen for 5 minutes and then was pressurized to 5 p.s.i.g. with oxygen. The reactor and contents were heated to 100° C. and 0.02 part of potassium persulfate in 2 parts of water was added during 10 minutes. Heating at 100° C. was continued for 10 minutes longer then the reaction mixture was cooled rapidly. The cloth was removed, washed with water, and placed in a reactor with 100 parts of water and 5.07 parts of freshly distilled methyl methacrylate. The vessel and contents were sparged with nitrogen for 30 minutes, then pressurized to 5 p.s.i.g. with nitrogen and heated at 90° C. for 10 minutes. During 15 minutes, there was then added 0.02 part of ferrous sulfate in 2 parts of water. The reactor was cooled, and the cloth was washed with water and dried. It weighed 1.768 parts, corresponding to a 1.5% add-on of poly(methyl methacrylate).

Strips of this cloth, 3 x 9 inches in size, were dipped in a commercial latex adhesive, wrung out and dried. An add-on 32% based on total weight, was obtained. The strips were then folded over on themselves and bonded under 22 p.s.i. for 60 seconds at 143° C. in a hydraulic press. The load on a stripping peel test (ASTM Test D903) was 1.28 pounds per inch width for the grafted cloth in contrast to 0.40 pound per inch width on a control of scoured, ungrafted cloth under identical test conditions.

The foregoing examples demonstrate the applicability of the process of this invention to various polymers capable of hydroperoxidation and to various forms of polymeric materials. They also demonstrate the utility of the polymers so hydroperoxidized in the preparation of graft copolymers.

What I claim and desire to protect by Letters Patent is:

1. A process for hydroperoxidizing a polymer which comprises contacting an aqueous suspension of a polymer, having hydrogen attached to tertiary carbon atoms in the polymer chain, with molecular oxygen at a temperature between about 20° C. and about 200° C. in the presence of a cationic surface-active agent, selected from quaternary ammonium salts, salts of rosin amines and salts of oleoyldiethylmethylene diamine, and a water-soluble persulfate.

2. The process of claim 1 wherein said cationic surface-active agent is an alkyl-trimethylammonium halide having 8–24 carbon atoms in the alkyl group.

3. The process of claim 1 wherein said cationic surface-active agent is a dialkyl dimethylammonium halide having 8–24 carbon atoms in said alkyl groups.

4. The process of claim 1 wherein said cationic surface-active agent is the acetate of disproportionated rosin amine.

5. The process of claim 1 wherein said polymer is crystalline polypropylene.

6. The process of claim 1 wherein said polymer is amorphous polypropylene.

7. The process of claim 1 wherein said polymer is ethylene-propylene copolymer rubber.

8. The process of claim 1 wherein said suspension of the polymer is contacted with air at a temperature between about 60° C. and about 140° C.

9. A process for preparing a graft copolymer of a polymer having hydrogen attached to tertiary carbon atoms of the polymer chain and a vinylidene monomer which comprises hydroperoxidizing said polymer by the process of claim 1, and contacting the resulting hydroperoxidized polymer with said monomer in the presence of a redox reducing agent.

10. The process of claim 9 wherein said polymer is polypropylene.

References Cited

UNITED STATES PATENTS 3,069,382  12/1962  Nikolov et al. _____ 260—877

MURRAY TILLMAN, Primary Examiner

JOHN T. GOOLKASIAN, Assistant Examiner

U.S. Cl. X.R.

260—80.78, 88.2, 94.9, 96

PO-1050
(5/69)

UNITED STATES PATENT OFFICE
CERTIFICATE OF CORRECTION

Patent No. 3,458,597    Dated July 29, 1969

Inventor(s) Harold Jabloner

It is certified that error appears in the above-identified patent and that said Letters Patent are hereby corrected as shown below:

Column 5, Table, all figures in last column are incorrect - should read as follows:

$$0.00\%$$
$$0.02\%$$
$$<0.01\%$$
$$0.04\%$$

SIGNED AND
SEALED

NOV 25 1969

(SEAL)
Attest:

Edward M. Fletcher, Jr.
Attesting Officer

WILLIAM E. SCHUYLER, JR.
Commissioner of Patents